United States Patent [19]

Bostock

[11] Patent Number: 5,117,307
[45] Date of Patent: May 26, 1992

[54] ROTATING WHEEL IMAGE MAKER

[76] Inventor: Harvey S. Bostock, 21 Alhambra Cir., Apt. 2, Coral Gables, Fla. 33134

[21] Appl. No.: 688,815

[22] Filed: Apr. 22, 1991

[51] Int. Cl.⁵ ............................................ G02B 23/00
[52] U.S. Cl. .................................................. 359/617
[58] Field of Search ........................................ 359/617

[56] References Cited

U.S. PATENT DOCUMENTS

| | | | |
|---|---|---|---|
| 1,383,019 | 6/1921 | Petrie | 359/617 |
| 2,991,689 | 7/1961 | Taylor | 359/617 |
| 3,738,036 | 6/1973 | Landsinger et al. | 359/617 |
| 4,475,126 | 10/1984 | Akins | 359/617 |
| 4,731,666 | 3/1988 | Csesznegi | 359/617 X |

Primary Examiner—Richard A. Wintercorn

[57] ABSTRACT

A device for using TV strobe signals to produce images and which comprises a hollow container with transparent facing sides. This device revolves around an axle through the center of the transparent facing sides. Within the device are loose objects. Holding this device before an operating TV screen and rotating it on the axle, the loose objects within the device interact with strobe signals from the TV to create images. Each time the container is spun, the loose objects, which have fallen into new positions, create new images.

1 Claim, 1 Drawing Sheet

ROTATING WHEEL IMAGE MAKER

BACKGROUND OF THE INVENTION

1. Field of the Invention

The invention relates generally to a device employing the strobe effect of television signals to create an endless variety of images each time said device is rotated in front of television pictures.

2. Description of the Prior Art

Prior devices produced images by viewing rotating colored objects or discs in tubes with mirrors or by simply looking through tubes at any scene which was then broken into kaleidescopic images by use of mirrors or prisms. However, in researching this application, no prior devices have been found which create images by combining TV strobe signals with the movement of loose objects or other light obstructing devices.

SUMMARY OF THE INVENTION

The invention is a device to utilize stroboscopic signals of a TV to provide an infinite series of images. Said device is spun on an axle and transparent sides of said device permit the viewing of loose objects within said device as they rotate in front of a TV screen. Said loose objects interact with the TV strobe signals to produce an image.

Thus this device permits use of TV strobe signals to produce kaleidescopic images and also provides a new kaleidescopic image each time said device is spun.

The device consists of two transparent, flat surfaces with holes in the center of each. The perimeters of one flat surface are joined to the perimeters of the other flat surface by material so that the two flat surfaces and the material along their perimeters form a hollow chamber. The flat surfaces should be parallel or closely parallel. The center of each flat surface will contain a hole. An axle is inserted through the hole of each flat surface, enabling the container to rotate on this axle. Loose objects are deposited in the container and since the flat sides are transparent, the loose objects are visible to the eye when the device is rotated.

Using loose objects to interact with strobe signals is a very simple, inexpensive and thus commercially attractive way to achieve an endless variety of visual images. There is no need for mirrors, prisms, reflecting surfaces or an eyepiece for viewing. Strobe signals are on and off impulses of light, sometimes faster than the human eye can detect, as for example, in a TV monitor. If the wheel of the invention with the loose objects contained within its chamber was spun before an ordinary light bulb or under daylight illumination, they would appear as a blur to the human eye. However, held in front of a TV and then spun, the strobe signals from the TV would catch the loose objects in various positions during their rotation, creating multiple images visible to the human eye. These multiple images create very pleasing symmetrical designs and in endless variety. In addition to being a simple and inexpensive device, it is also attractive commercially because the source of strobe signals is available in almost every home, since the TV is a common household item and most homes have at least one and many have more.

DESCRIPTION OF THE PREFERRED EMBODIMENT

Figure 1:
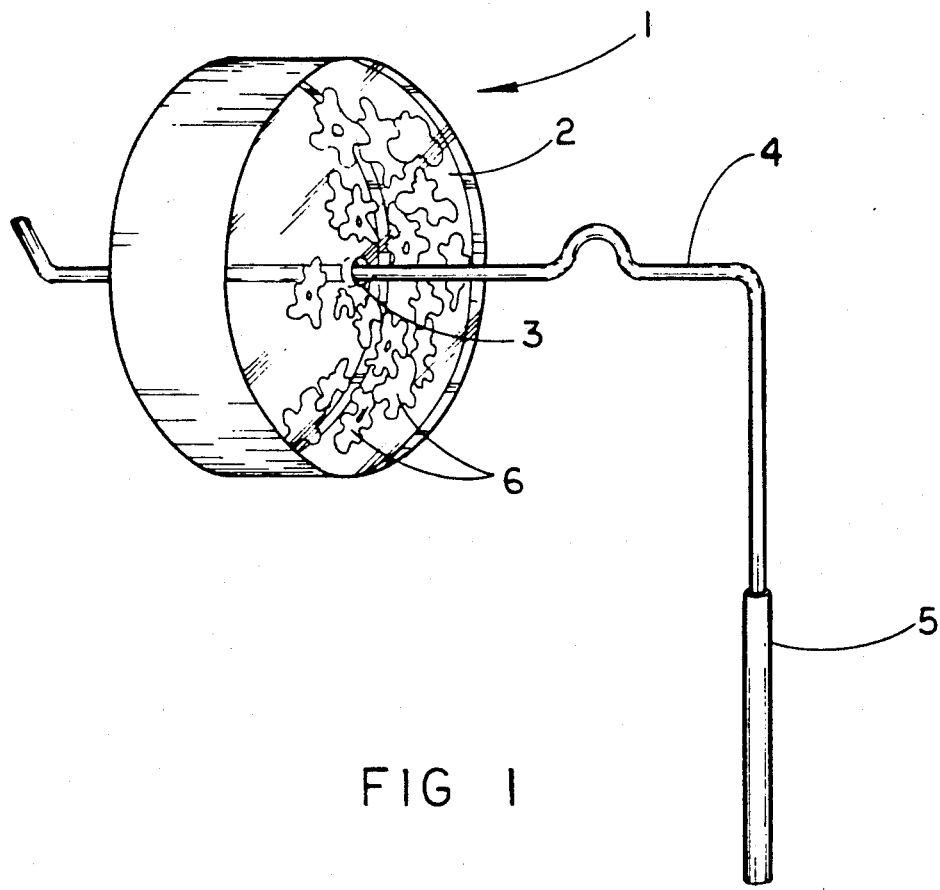
FIG. 1 is a ¾ view of said hollow container device with transparent facing sides as viewed from the right.
Figure 2:
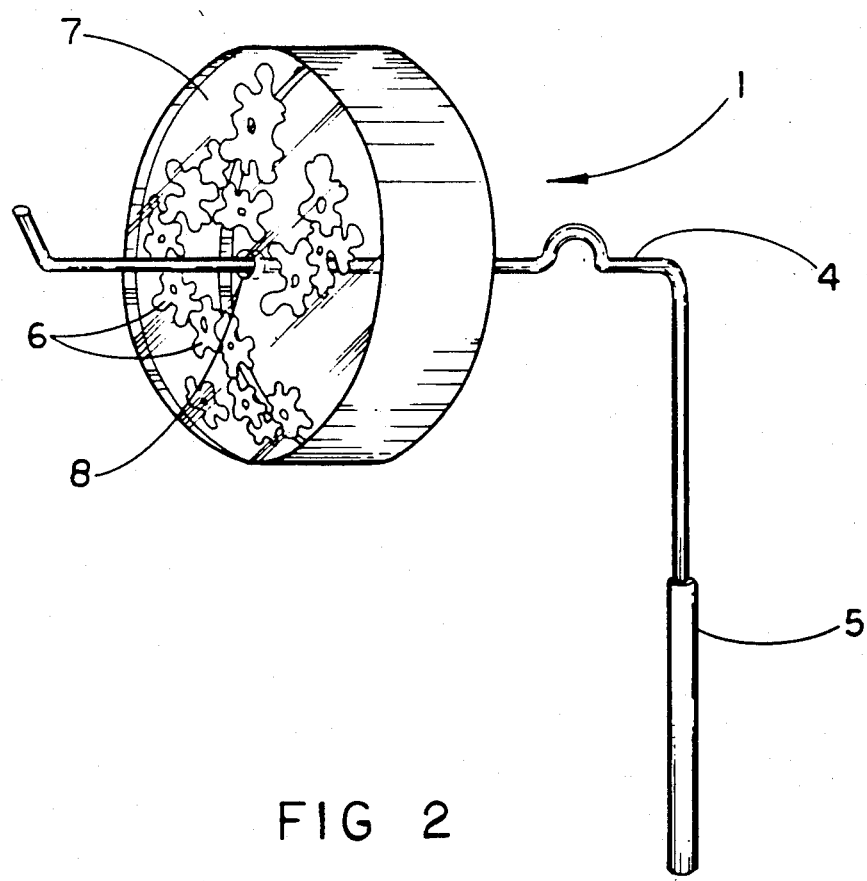
FIG. 2 is a ¾ view of said device as viewed from the left.

Referring to FIGS. 1 and 2, an embodiment of the Rotating Image Maker is shown. In this embodiment, a hollow container device 1 is shown with transparent faces 2 and 7 and said transparent faces contain holes 3 and 8 through their centers.

These two transparent faces are flat and parallel or closely parallel to each other and the perimeters of one are joined to the perimeters of the other by material so that the two flat transparent surfaces and material joining their perimeters form a hollow container. Through center hole 3 and 8 sits an axle 4, one end of which 5, can be used as a handle. The hollow container can thus be made to rotate around axle 4. Inside said container device are various loose objects 6. Said container device with axle allows said loose objects to be carried along in this rotating motion and transparent faces 2 and 7 of said container device allows viewing of these loose objects as well as the strobe signals of an operating TV screen beyond, during this rotary motion of said container. The viewer can thus seen the reaction of the combination of the rotating loose objects in said container device with the strobe signals of the TV screen, in which action, images are made to appear as a result of this interaction between the rotating loose objects and the TV signals.

I claim:

1. A rotating wheel image maker which comprises:
  (a) a hollow container composed of two transparent flat or planar surfaces, each said surface having a hole in its center, and each said surface facing the other parallel or closely parallel and perimeters of one said flat surface connected to the perimeters of the other said flat surface by material so as to form a hollow container;
  (b) an axle which fits through said center holes of each of said transparent flat surfaces so as to enable the two said joined flat surfaces now constituting said hollow container, to revolve around said axle when said container is spun;
  (c) loose objects within confines of said container and said loose objects visible to the eye and whereby said loose objects moving into different positions each time said container is rotated on said axle, whereby said loose objects in these positions interact with strobe signals received from an operating TV.

* * * * *